(12) United States Patent
Davis

(10) Patent No.: US 6,347,487 B1
(45) Date of Patent: Feb. 19, 2002

(54) FLOOD RESISTANT BUILDING STRUCTURE

(76) Inventor: Paul Philip Davis, 125 Tallawong Rd, Rouse Hill NSW (AU), 2155

( * ) Notice: Subject to any disclaimer, the term of this patent is extended or adjusted under 35 U.S.C. 154(b) by 0 days.

(21) Appl. No.: 09/639,176

(22) Filed: Aug. 16, 2000

(30) Foreign Application Priority Data

Aug. 11, 1999 (AU) .......................................... PQ 2146

(51) Int. Cl.[7] .................................................. E04H 9/00
(52) U.S. Cl. ................................. 52/1; 52/64; 52/169.9; 405/229
(58) Field of Search .......................... 52/64, DIG. 12, 52/1, 169.9, 169.2, 292; 405/196, 249, 229, 195.1; 114/44, 45

(56) References Cited

U.S. PATENT DOCUMENTS 4,083,149 A * 4/1978 Hickman et al. ............. 49/147
5,850,718 A * 12/1998 MacKarvich ................. 52/292
5,904,446 A * 5/1999 Carlinsky et al. ........... 405/229
6,050,207 A * 4/2000 Mays .......................... 114/45

* cited by examiner

Primary Examiner—Carl D. Friedman
Assistant Examiner—Naoko Slack

(57) ABSTRACT

The present invention relates to building structures that are floatable so that damage is reduced in the event of a flood. A sealed floor structure is described such that the entire superstructure can float under the influence of flood waters. The floor structure is supported above grade upon corbels and thence by a series of columns disposed around the perimeter of the building. The perimeter columns generally lie outside the superstructure envelope and continue up to or beyond the eaves level of the structure. As the building floats vertically these columns, via a sleeve mechanism, act to limit any horizontal movement of the structure. Mechanisms incorporated within the columns and floor structure limit the upward travel of the structure under the influence of flood waters.

16 Claims, 10 Drawing Sheets

FLOOD RESISTANT BUILDING STRUCTURE

BACKGROUND OF THE INVENTION

The present invention relates to flood resistant building structures, and more particularly to building structures that are floatable such that damage is reduced in the event of a flood.

The invention has been developed primarily for use with residential structures in relatively flood-prone areas, and will be described hereinafter with reference to this application. However, it will be appreciated that the invention is not limited to use in this field.

Historically waterways have been useful for transportation of goods and people, and as a water supply for industry and agriculture. Land near waterways, lakes and the like also tends to be aesthetically pleasing. For these and other reasons, early human settlements tended to be built relatively close to waterways, and rivers in particular. This pattern has been repeated over time, notwithstanding improvements in land-based transport and water distribution networks.

Unfortunately, land adjacent waterways and in low-lying areas is relatively prone to flooding. Flooding can cause tremendous emotional and financial damage as structures and businesses are damaged, and personal property destroyed. Worldwide, the annual cost of flood damage and displacement runs into many billions of dollars every year. For building occupants and owners this is a particularly pressing problem as it is frequently difficult or at least expensive to obtain insurance cover against flooding. Naturally, the more prone to flooding an area is, the more difficult it will be to obtain such insurance.

One of the difficulties of planning for buildings in flood prone areas is that floods occur at irregular intervals and that the magnitude of less common floods can be substantially greater than those floods that occur over a typical human lifetime.

Conventional buildings, such as the house 200 shown in FIG. 1, are built with a floor level 205 at or near ground level 125. Clearly this is an undesirable form of construction for use in flood-prone areas, simply because flood waters of any substantial depth can advance higher than the floor level. Further, such buildings can obstruct the flow and egress of flood waters, potentially exacerbating flooding problems. Regulatory bodies may therefore require an "above-grade" construction.

An example of the usual approach to above-grade construction is shown in FIG. 2. A conventional building 100 includes a superstructure 105 constructed atop piers 115 that are fixed into foundations in the underlying ground. This arrangement is used to permanently maintain the building superstructure 105 and its associated floor structure 110 at a predetermined height above grade level 125. The piers 115 are often braced 120 to reduce lateral movement in, for example, high winds. This arrangement allows low level floodwater to pass beneath the building without actually flooding the superstructure 105 or floor structure 110. This arrangement has been used since early civilisation, without fundamental changes other than in building materials and construction methods.

However, there are a number of specific disadvantages with the arrangement of FIG. 2, such as:

(a) flood waters may advance higher than the raised floor level 110;

(b) the fixed piers 115 may be unsightly, especially if they are relatively high to deal with correspondingly high potential flood water situations;

(c) building regulations may place restrictions on maximum roof or floor heights, which can prevent sufficiently long piers being used;

(d) in very low-lying areas or areas prone to deep flooding the required pier height can be considerably higher than is desirable given the need for day-to-day access for residents.

In an effort to mitigate some of the problems with fixed elevated structures, various techniques have been proposed for constructing floatable buildings at grade level on dry land.

One such technique is disclosed in U.S. Pat. No. 5,347,949 by Paul K. Winston (hereinafter referred to as "Winston"). As shown in FIG. 3, Winston discloses a prefabricated modular housing unit 300 for use in flood prone areas. In particular, there is shown a cross section of a floatable housing unit 300 floating on floodwater 305. The housing unit 300 uses flotation elements 310 formed from plastic liners 320 filled with foam 315. The flotation elements 310 are seated underneath a foundation 325 of wooden beams fastened to a conventional floor joist system.

The housing unit 300 is anchored to the building site through a series of telescopically extendible piers 330, in combination with a series of wooden pilings 340 that serve as a fixed dry-land foundation.

During a flood, the flotation elements 310 displace water until the entire weight of the building's superstructure is supported by them. As the flood waters continue to rise, the housing unit 300 is raised by the flotation elements 310, which act as pontoons. The building is maintained in a substantially constant lateral position by the extendible piers, which slide telescopically from their submerged recesses as the housing unit 300 is raised by the flotation elements 310.

The Winston arrangement suffers from a number of disadvantages. For example, the extendable telescopic piers 330 are exposed even in the retracted position, and can be subject to ingress of moisture and dirt over time. Moreover, the exposed portions of the piers 330 can corrode, inhibiting their subsequent extension. Additional corrosion can occur as floodwater rises and the telescopic piers 330 extend. Water even fills the extended telescopic piers 330, apparently to provide a damping effect. However, this also washes away protective lubricants, further accelerating corrosion.

In addition the foam filed plastic liners are potentially prone to degradation over the long term. Under normal conditions, access for inspection and maintenance to these units is limited. The foam liners also provide a ready means of ingress for termites to the building structure in regions where termites are active.

In addition, the Winston housing unit 300 is unstable when it floats and requires careful balancing of loads. On the heavy portion of the housing unit 300, larger foam flotation elements 310 are required. The load distribution in the housing unit 300 shifts as the building is furnished. To compensate for shifting loads, air bladders 350 at each corner of the housing unit 300 are required. The air bladders 350 are filled with proper amounts of air to provide a stable and level flotation. This is complex, inefficient and time consuming as it requires a compressor, a level measuring device and fine tuning (i.e. repeated inflation and deflation) of each air bladder to achieve a level flotation. For example, inflating a first air bladder often requires re-adjusting the air in the remaining three air bladders 350, which in turn can necessitate further re-adjustment of the first air bladder.

Furthermore the Winston disclosure does not reveal a manner whereby the additional buoyancy forces applied to the floor structure 325 from the bladders 350 can be transmitted laterally to support movable loads, such as people and furniture that are not directly over the bladders 350. Thus, with the disclosed floor joist system, it is likely that there will be relative movement within, and hence physical distress to, the housing unit 300.

Furthermore, the potential for a low pressure region between the ground, pontoons and floor of the Winston arrangement suggests that in some circumstances the housing unit 300 may not float.

Another technique proposed for constructing floatable buildings at grade level on dry land is disclosed in U.S. Pat. Nos. 5,647,693 & 5,775,847, by Herman Carlinsky et al (hereinafter referred to as "Carlinsky"). As shown in FIG. 4, Carlinsky discloses a prefabricated building 400 including a watertight basement 405, the floor and walls 410 of which are of unitary concrete constriction. Rollers 415 are attached to outer surfaces of the watertight basement (405).

As floodwater rises or recedes, the rollers 415 roll along a guide post/ratchet system 420 located adjacent respective corners of the watertight basement 405. The guide system 420 maintains the building 400 at or near the height reached during a peak of a given flood.

One embodiment disclosed by Carlinsky includes pressurised cylinders 430 for lifting the building 400 prior to a surge of floodwater and for breaking any vacuum formed under the basement 405 as the building first lifts under the influence of floodwaters.

The Carlinksy system suffers a number of disadvantages. For example, to reposition the building at ground level after even a minor flood, it is necessary to deploy lifting mechanisms at several points around the building perimeter. The provision of cranes or other lifting devices to achieve this is both costly and inconvenient.

Furthermore, Carlinsky does not disclose the manner in which the buoyancy forces generated during a flood are transferred from the unitary basement structure 405 to the rest of the building 400. Carlinsky also fails to disclose the way in which loads from the building superstructure are transmitted through the basement 405 to the post/ratchet system 420 in the post flood situation. It is likely that excessively large concrete cross sections will be required to achieve a sufficiently stiff and strong basement structure 405 if the building 400 is constructed according to the disclosure.

In addition, all debris under collecting under the basement during a flood must be removed before the building can be lowered into its normal position after a flood event.

The method of construction using a monolithic concrete basement 405 is potentially expensive and inappropriate on some sites or in some regions.

In addition, the Carlinsky system is cumbersome and potentially unreliable. The system relies on the actuation of pressurised systems 430 and a series of rubber seals, all of which may not reliably activate in a flood that may occur many decades after the building is constructed.

Both the Winston and Carlinsky systems suffer from another serious disadvantage. In each case, where flood waters continue to rise once the structure has reached its uppermost limit of travel, the buoyancy forces continue to rise. According to buoyancy theory, these forces are proportional to the amount of water displaced, and can therefore reach relatively large values. Three possible scenarios are then possible. Firstly the building subject to high water may simply float away off the top of its guides. Alternatively, the building can be constrained at the upper limit of its travel, but then risks being violently and unpredictably torn from the constraints under the influence of increasing flotation forces. Both scenarios are potentially disastrous and are worse than the consequences of the flooding event that the systems were trying mitigate. A final option is to construct the building and its guidance system robustly enough to resist the maximum buoyancy forces. However, this is relatively expensive.

A technique is also proposed for constructing a building or other structure that is supported above the water level during a flood. This is disclosed in U.S. Pat. No. 6,050,207, by Vance H. Mays (hereinafter referred to as "Mays"). As shown in FIG. 5, Mays discloses a building or other superstructure 1801 supported upon a frame 1803 supported by a series of pontoons 1809. The pontoons slide within casings 1802 and float on a controllable volume of liquid contained within the casings. Columns 1808 slide through a series of bearings and seals incorporated in a cover attached to the top rim of the casing. The frame 1803, and hence the building superstructure 1801 is supported upon the columns and restrained in a lateral position by the columns via the bearings in the casing.

When the building is raised the columns transmit the weight of the superstructure via the pontoons to the liquid in the casing. At other times the columns transmit this weight directly to the casing and thence to the foundation.

As the amount of liquid is varied within the casings the pontoons rise or fall, thus causing the superstructure to rise or fall. The amount of liquid in the casing is altered via a series of valves and pumps, these being actuated by electrical batteries and/or generators 1807. Sensors 1804 monitor the relative level of the structure and other sensor 1805 monitor the flood water level. Manual or computer control 1806 activates the system and acts to keep the structure level.

The Mays system suffers a number of disadvantages. For its basic operation the system relies upon a relatively complex system of electrical systems, mechanical systems and structures. Furthermore the flotation units are normally installed under the ground and so under normal conditions access for inspection and maintenance to these units is limited. Hence, these may not reliably activate in a flood that may occur many decades after the structure is constructed. This could result in damage to the superstructure or to the flotation units themselves.

For example failure of any one of the bearings, seals, valves, monitoring or control systems could cause one of the pontoons to "stick". Alternatively failure of a seal or valve could cause an uncontrolled volume of fluid to enter the casing causing one pontoon to rise excessively. In either case this could cause damage to the flood support systems or to the building structure itself.

In addition the systems and structures disclosed by Mays are likely to be expensive relative to the cost of the superstructure. This has the potential to render the system economically unfeasible in many situations.

The Winston, Carlinsky and Mays systems all suffer from a disadvantage in that they allow free vertical movement of the structure under the influence of buoyancy forces but they do not disclose a method whereby the building structure is prevented from upwards movement under the influence of wind loads. As a consequence potential exists for excessive damage to the building structure during a wind storm.

It is an object of the present invention to overcome or at least substantially ameliorate one or more of the disadvantages of the prior art.

BRIEF SUMMARY OF INVENTION

According to a first aspect of the invention, there is provided a flood resistant structure for use in flood-prone areas, the structure including.

a plurality of guide posts extending substantially vertically from support foundations;

a building structure disposed adjacent the guide posts;

flotation means disposed under or within the building structure, the flotation means being of sufficient buoyancy to enable the building structure to float on water when necessary;

guide means linking the building structure and the guide posts; and support means associated with the guide posts;

the flood resistant structure being configured such that, in a usual mode of operation, the building structure is supported by the support means and thereby the guide posts until flood waters rise to a level sufficient to cause the weight of the building structure to be transferred from the support means to the flotation means, wherein further increases in flood-water level cause the building structure to float upwardly whilst the guide means maintain the building structure in a relatively stable lateral position with respect to the guide posts.

Preferably, the guide posts are disposed adjacent one or more corners of the building structure.

In a preferred form, the support means take the form of corbels disposed on respective guide posts at a predetermined height, such that the building structure is supported at a predetermined height by the corbels during the usual mode operation of the flood resistant structure.

Preferably, the flotation means takes the form of air filled compartments formed in a floor area of the building structure.

In a particularly preferred embodiment, the flood resistant structure further includes retention means configured such that, once the building structure has floated beyond a predetermined height in relation to the guide posts, it is prevented by the retention means from lowering with the flood waters as they recede. Preferably, the retention means takes the form of a ratchet and pawl, or spring-loaded corbel mechanism.

In another preferred embodiment, the flood resistant structure further includes selective flooding means for allowing at least partial flooding of some or all of the flotation means.

Further aspects of the invention are disclosed in the accompanying detailed description and in the numbered paragraphs at the end of the specification.

BRIEF DESCRIPTION OF THE SEVERAL VIEWS OF THE DRAWING

Preferred embodiments of the invention will now be described, by way of example only, with reference to the accompanying drawings, in which.

DETAILED DESCRIPTION OF THE INVENTION

Figure 1:
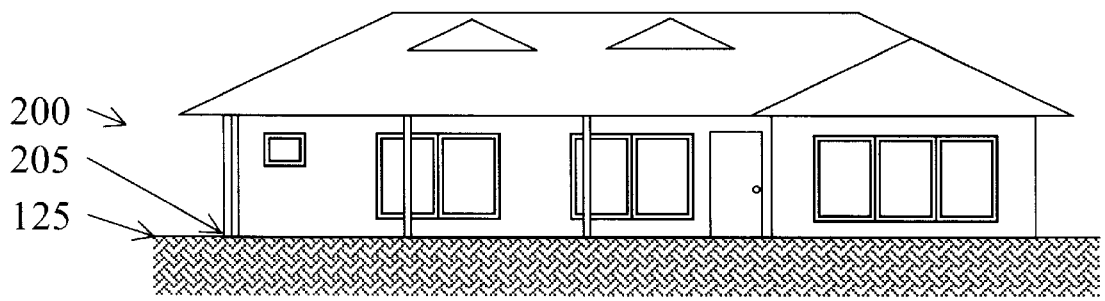
FIG. 1 is an elevation of a prior art at-grade building.
Figure 2:
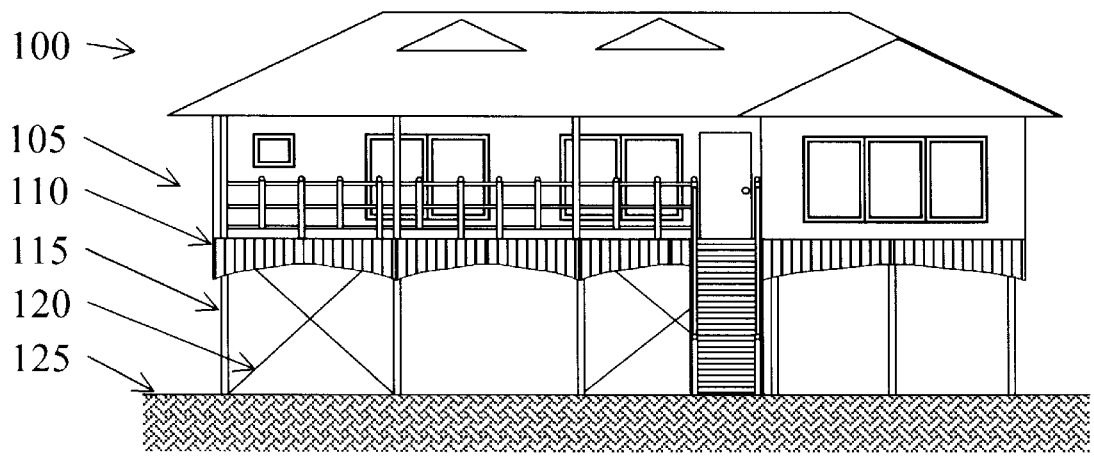
FIG. 2 is an elevation of a prior art above-grade building.
Figure 3:
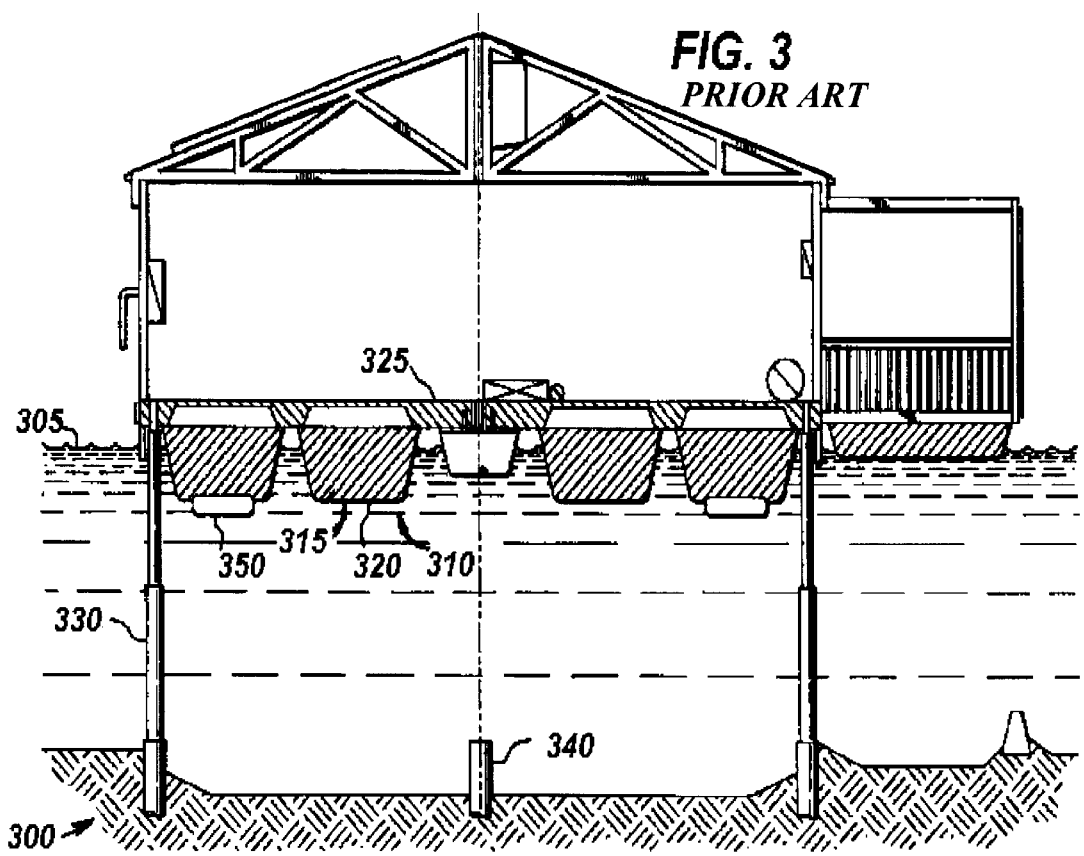
FIG. 3 is an elevation of a prior art floatable building structure.
Figure 4:
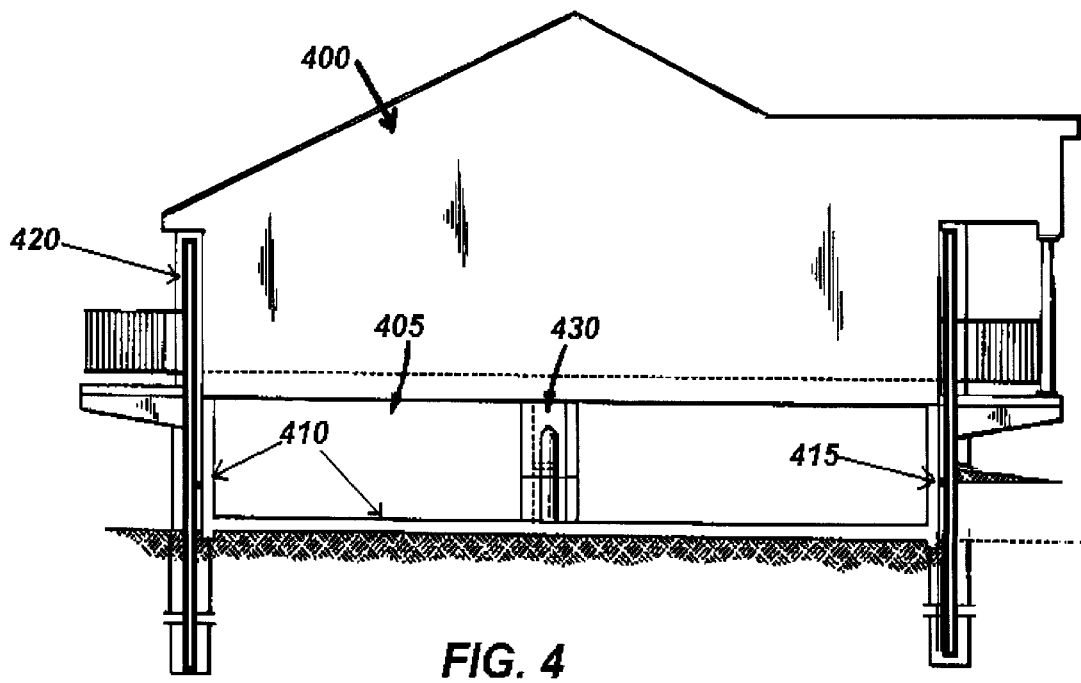
FIG. 4 is an elevation of an alternative prior art floatable building structure.
Figure 5:
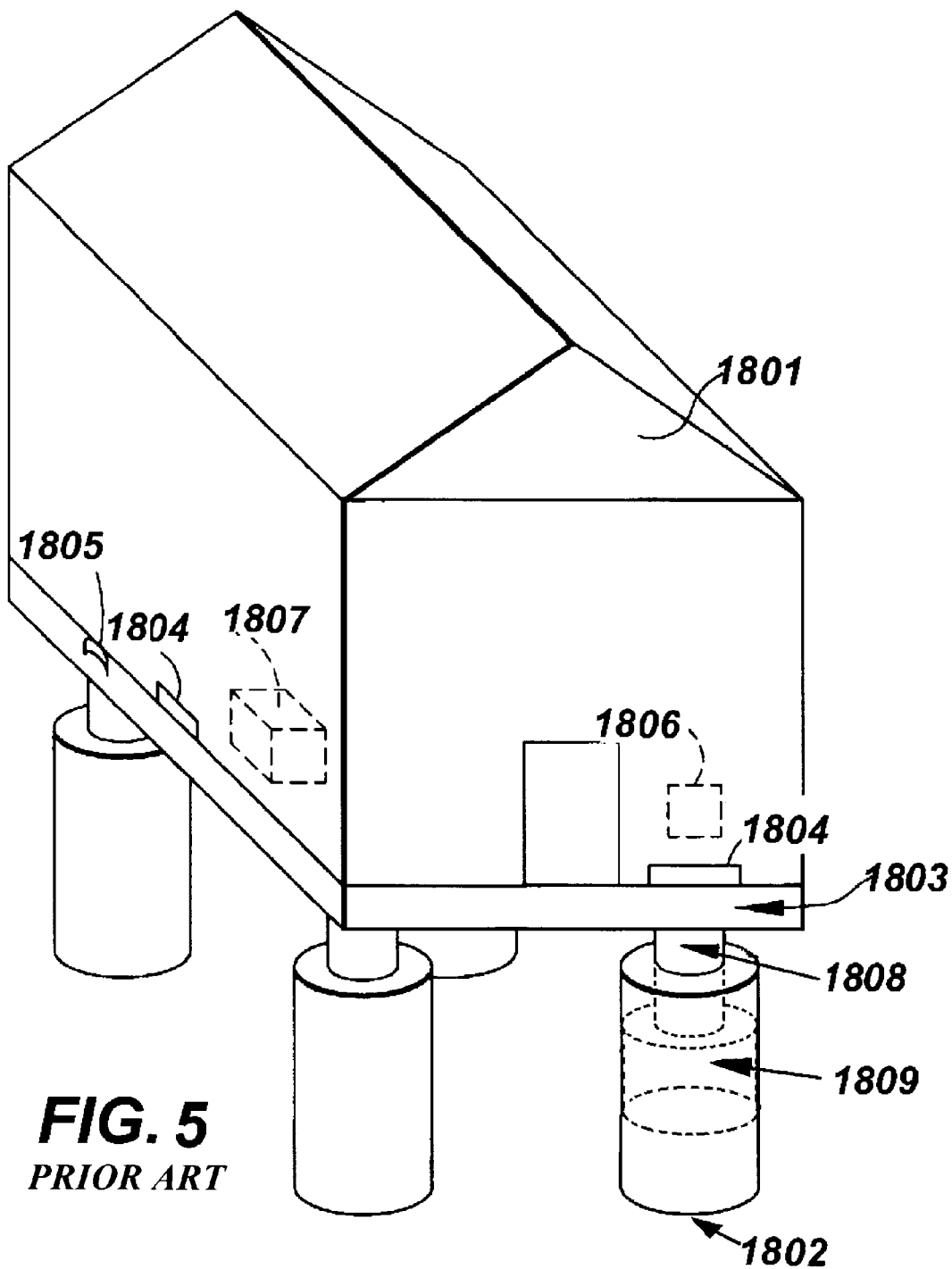
FIG. 5 is a perspective view of a prior art building structure supported by pontoons floating on a controllable volume of liquid.
Figure 6:
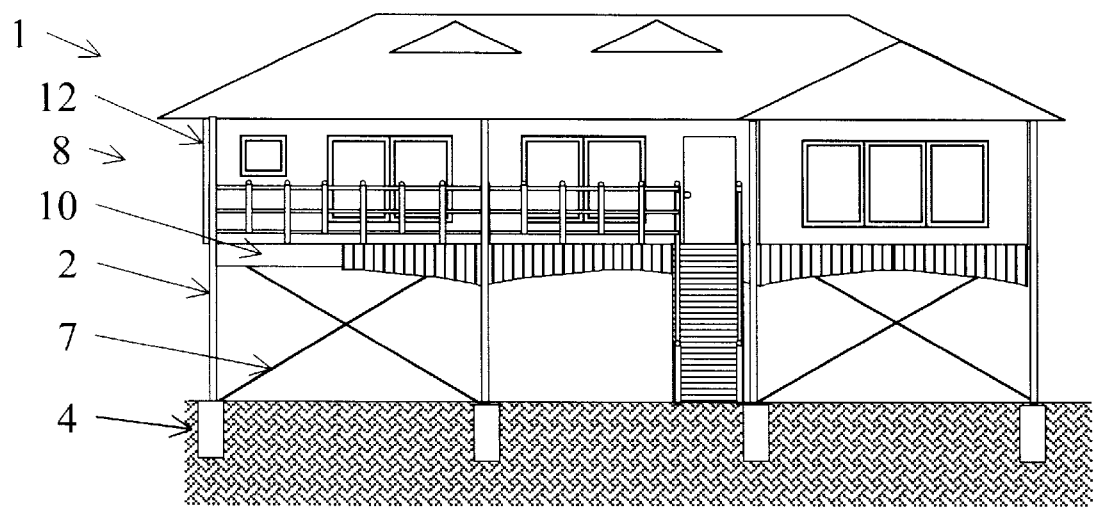
FIG. 6 is an elevation of a preferred embodiment of a flood resistant structure according to the invention.

Referring to the drawings, and FIG. 6 in particular, there is shown a flood resistant structure 1 for use in flood prone areas. The structure 1 includes a plurality of guide posts 2 extending substantially vertically from support foundations 4. The guide posts 2 can be formed from any suitable material on the basis of aesthetics, functional requirements and local regulations. Examples of suitable materials include stainless or galvanised steel, or any other suitable corrosion resistant material. It will also be appreciated that the guide post can be of any suitable configuration or cross-sectional shape. For example, if formed from steel, the guide posts will typically be of hollow rectangular, square or circular cross section, or take the form of an I-section. Wooden guide posts 2 will typically be rectangular, square or circular in cross section.

As best shown in FIG. 6, in the preferred embodiment, sub-floor bracing 7 is provided to reduce horizontal movement of the building 8 under the action of flood or wind forces. The sub-floor bracing can take the form of any conventional bracing arrangement known to those in the field of construction.

Figure 7:
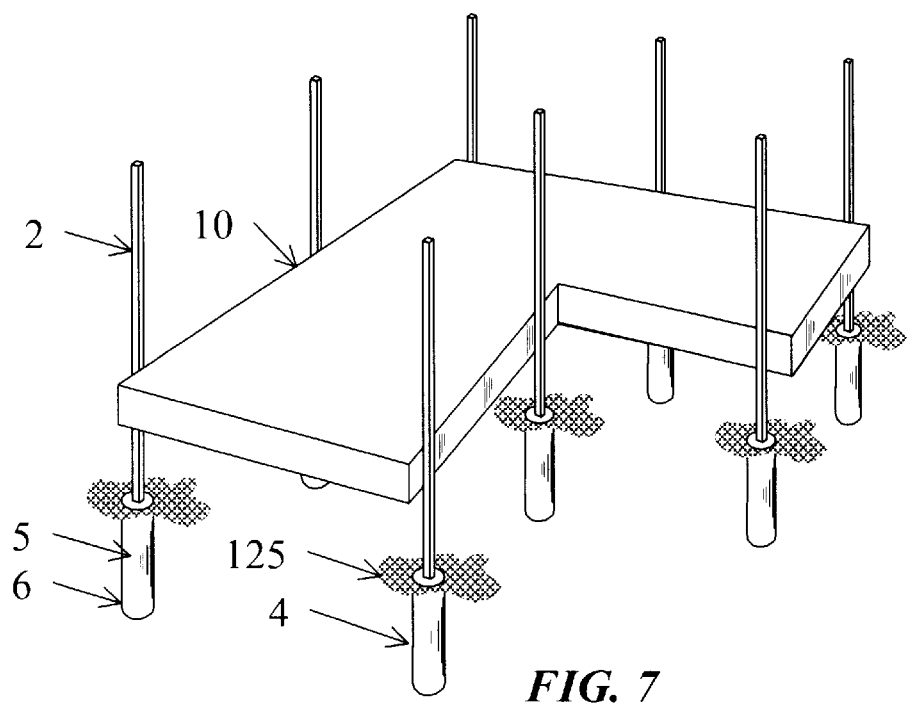
FIG. 7 is a perspective cut away view of a floor and guide posts used in the flood resistant structure of FIG. 6.

As best shown in FIG. 7, typically, the support foundations 4 take the form of concrete caissons 5, the concrete for each guide post 2 being poured into a suitable hole 6 and allowed to set whilst the guide post is held in a substantially vertical position. In cases where the ground is relatively soft or potentially unstable, deeper concrete piers or the like can be used to support or even take the place of the concrete caissons 5.

Figure 8:
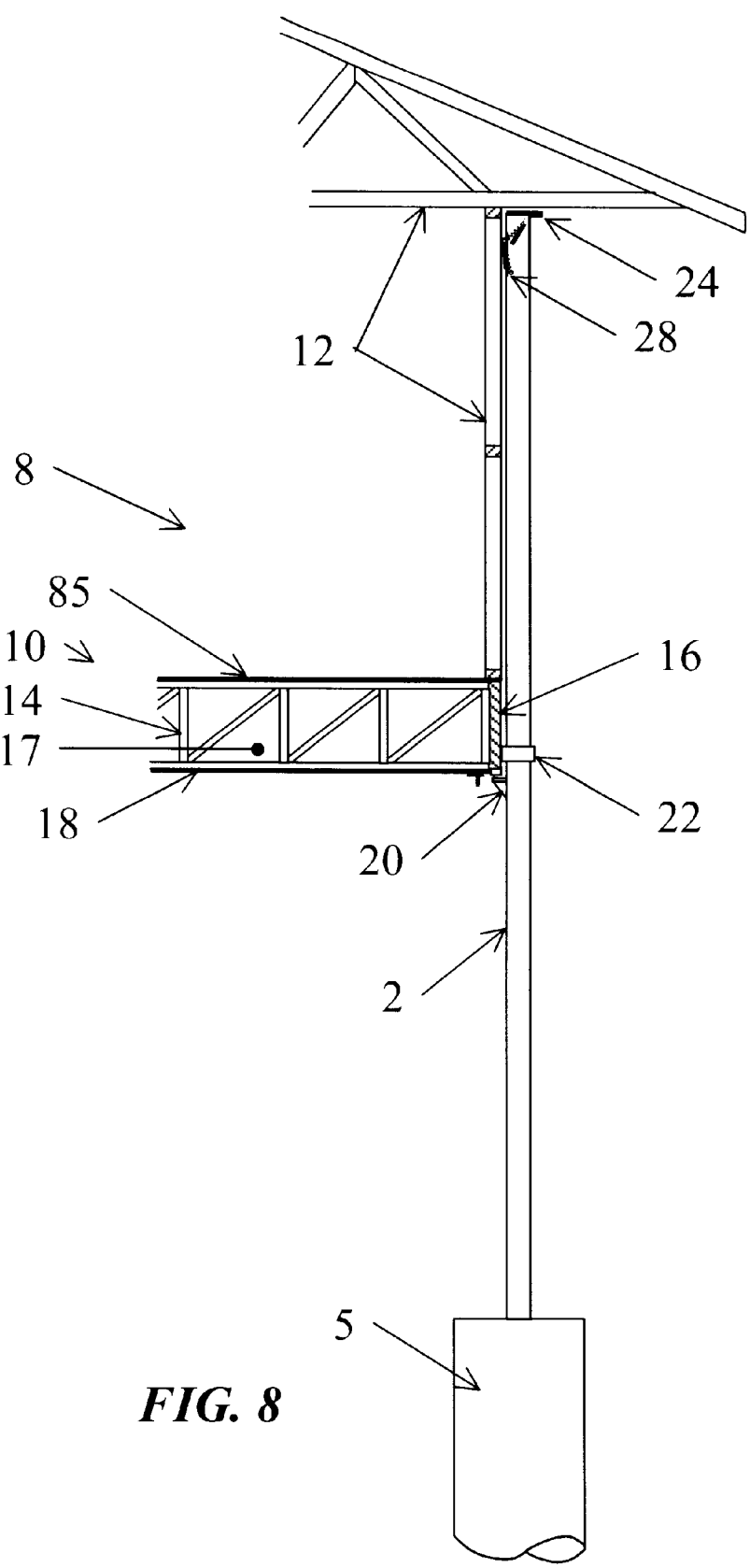
FIG. 8 is a sectional view of a portion of the building structure of FIG. 6.

The flood resistant structure 1 also includes a building structure 8 that includes a floatable flooring structure 10 and a superstructure 12. As best shown in FIG. 8, the flooring structure 10 includes a plurality of trussed floor joists 14, which extend between rectangular section beams 16. The floor joists 14 can be made of any suitable material, including timber or steel. The rectangular section beams 16 can be formed from timber, steel (preferably galvanised), stainless steel, laminated veneer timber, laminated timber, composite timber and plywood box beams, a combination of any or all of these materials, or any other structurally suitable material.

It will be appreciated that additional rectangular section beams 16 may be disposed around the perimeter of the floor structure 10 in locations where they are not required to support the trussed floor joists 14, but where they contribute to form the sides of the compartment 17 as described below.

Undersides of the joists 14 and rectangular section beams 16 are covered by a sheeting material 18. In the preferred embodiment, the sheeting material 18 is structural, in that it adds to the strength and rigidity of the flooring structure 10 as a whole. Furthermore, the sheeting material 18 is waterproof, or at least made waterproof by application of a suitable coating, doping compound or membrane.

It will be appreciated that the sheeting material 18 can take any suitable form. For example, it can be pliable, like thin plastics sheeting; semi-flexible, like thicker sheets of plastics or rubberised materials; or relatively rigid, such as plywood, compressed fibre cement sheeting or sheet aluminum. Clearly, it is desirable that the sheeting material 18 be corrosion resistant and durable, because of the relatively long life-time required of housing in general. Further, the subfloor position of the sheeting material 18 means that maintenance can be inconvenient, making corrosion and rotting resistance even more important.

The sheeting material 18 is attached to the undersides of the trussed joists 14 and rectangular section beams 16 in a waterproof manner, such that each rectangular section defined by adjacent joists and beams is sealed to form a compartment 17 that is water-tight against ingress of water from below. The attachment can be mechanical, using corrosion resistant nails or screws for example. Alternatively, a suitable adhesive can be use. Supplementary sealants, such as silicone, can also be employed to seal any cracks.

It will be appreciated that the compartments 17 need not be completely sealed, so long as the compartments as a whole are sufficiently buoyant to support the weight of the building structure 8. Indeed, for the purposes of "scuttling" as described below, it will in many cases be desirable to provide an exit pathway for air trapped in each, or at least some, of the compartments. This pathway can take the form of predetermined vents and passageways starting at an upper area of each compartment, or can simply take the form of unsealed cracks and joints between upper regions of the joists and beams making up the floor structure. The upper sides of the joists 14 and beams 16 are clad with suitable flooring materials 85, typically timber boards, particleboard or plywood covered with, for example, carpet or vinyl flooring materials. It will be understood that other floor coverings can also be used.

The rectangular beams 16, joists 14 and their method of construction are selected to provide structural properties sufficient to support the superstructure 12 and other loads imposed by the building contents and occupants. Further the beams 16 act as the waterproof sides to the floatable floor structure 10.

The superstructure 12 in the preferred embodiment is of standard light-weight construction, and can be constructed on site atop the flooring structure 10. Alternatively, it can be prefabricated and assembled relatively quickly on-site. Typically, the superstructure 12 and flooring structure 10 are built or assembled on or near ground level, and then raised into position along the guide posts 2.

The superstructure 12 is constructed of conventional building materials, such as aluminium, wooden, or fiber cement material cladding over a wooden, cold formed steel, or other frame work. This type of construction is relatively light and strong, and so is particularly suited for use with the floor structure of the present embodiment.

It will be noted, as best shown in FIG. 7, that, in this embodiment, the guide posts 2 are external to the building structure 8, and generally equally spaced around its periphery. Depending upon the required guide posts length, it may, in some cases, be desirable for the upper ends of the guide posts 2 to extend within the roof cavity of the building structure 8. Alternatively, where additional guide post height is required, the upper ends of the guide posts 2 can extend above the level of the roofline. However, it will be appreciated that there will typically be regulatory or at least aesthetic limitations on the allowable guide post height.

Returning to FIG. 8, the flood resistant structure also includes support means in the form of corbels 20, one of which is provided on each guide post 2 at a predetermined height. The corbels 20 are positioned such that the flooring structure 10 and thereby the building structure 8 as a whole are supported levelly at a predetermined height above grade level. Depending upon the likelihood of relatively low level floods, it may be desirable that the building structure be maintained at a relatively substantial height above grade level, of several meters or more. However, where the chance of anything other than occasional serious flooding is low, it may be desirable that the building be supported only slightly above grade level. The particular height can also be chosen on the basis of other factors, such as government regulations in relation to housing, and specific access requirements for residents.

Figure 9:
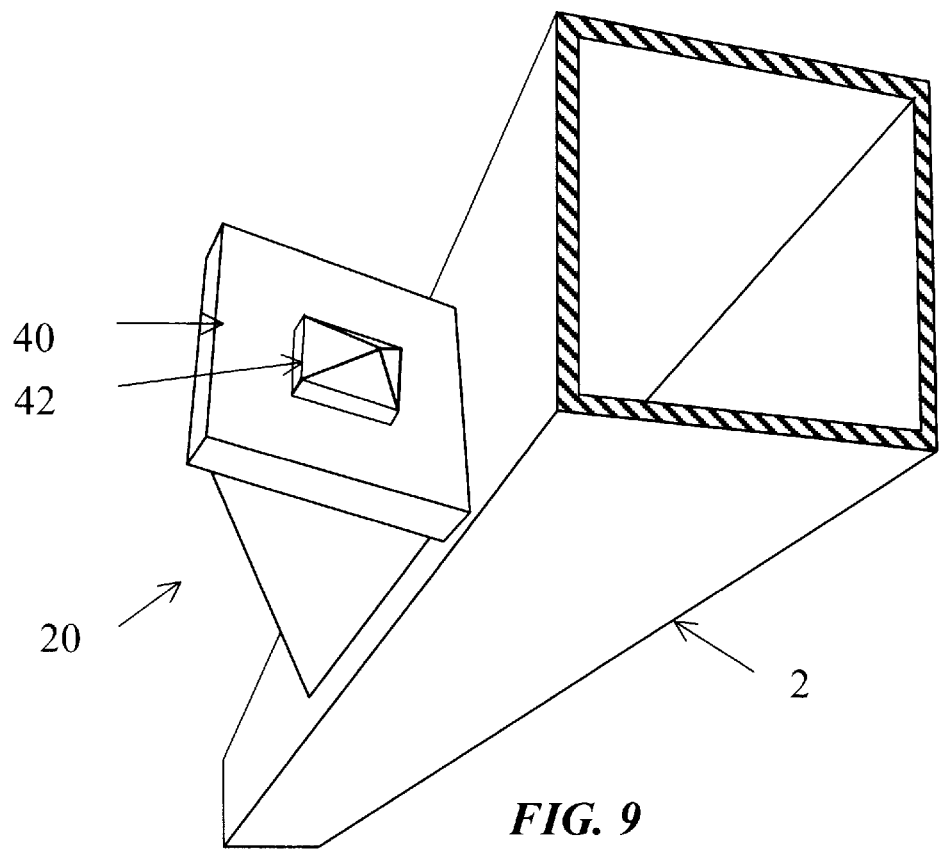
FIG. 9 is a perspective view of a guide post and corbel arrangement.

As best shown in FIG. 9, each of the corbels 20 includes an upper surface 40, upwards from which extends locating means in the form of a tapered pin 42. In this case, the pin is pyramdal, but it can take any offer few, such as conical or frusto-conical, or even cylindrical or post-like.

Figure 10:
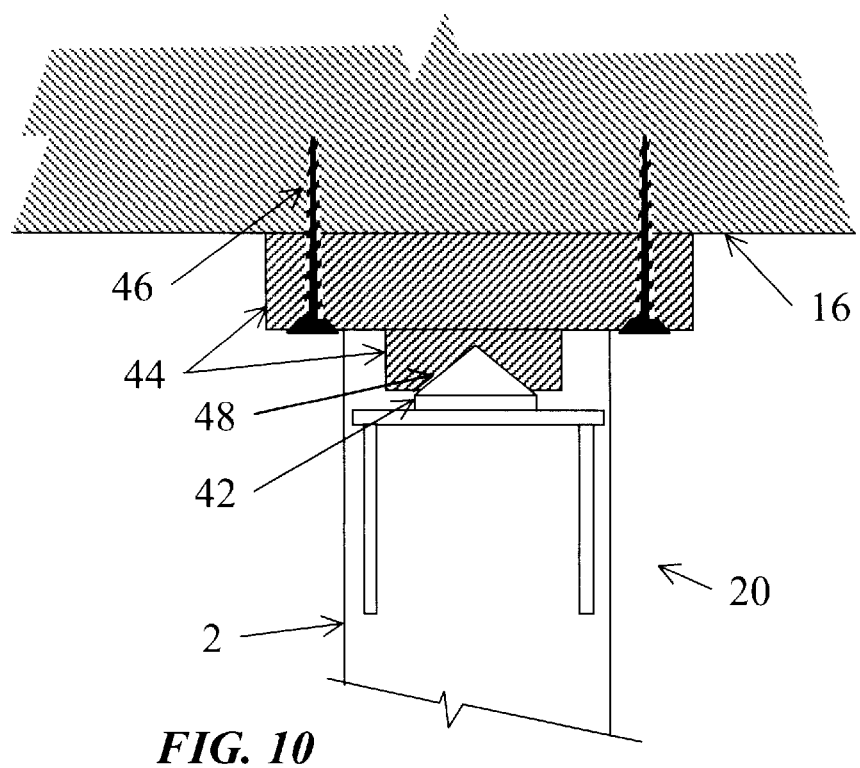
FIG. 10 is a sectional view of the corbel shown in FIG. 9, in use.

Turning to FIG. 10, there is shown an elevation of one of the corbels 20 and adjacent rectangular beams 16. A load spreader 44 is fixed to the underside of the beam 16. It will be appreciated that, the load spreader can take many forms, for example a plate, bar, or a combination thereof. The load spreader 44 can be fixed to the beams 16 by means of screws (as shown, designated 46), nails, bolts, glue or a combination thereof. Each load spreader 44 is located adjacent a respective guide post 2, and includes a load spreader recess 48 that is at least partially complementary to a corresponding pin 42 on an adjacent corbel 20. Each of the load spreaders 44 is vertically aligned with its corresponding pin 42, such that, as the corresponding beam 16 comes to rest on its respective corbel 20 after a flood, the conjunction of the pin 42 and recessed load spreader 44 act to vertically support and align the floatable floor structure 10 with the corbels 20. In their preferred form, the corbels and load spreaders are steel, galvanised to prevent corrosion. Naturally, any other suitable materials can be employed.

In the preferred form, the depth and size of the pins 42 and recesses 48 in the load spreaders 44 are selected such that the underside of the beams 16 are supported slightly proud of the flat surface of the corbel 20. This facilitates free flow of air under the beams 16, thereby reducing moisture retention and correspondingly reducing the probability of corrosion of any metallic elements and biological attack upon any timber elements.

It will be appreciated that, in other embodiments, the relative positions of the pin 42 and recess 48 can be swapped between the corbel 20 and the load spreader 44. In this case it is desirable that the recess in the corbel include a drain hole to allow the egress of any moisture that would otherwise accumulate in the recess.

In a non-flood situation the beams 16 span between the corbels 20 and so vertically support the floor structure 10 and superstructure 12.

Figure 11:
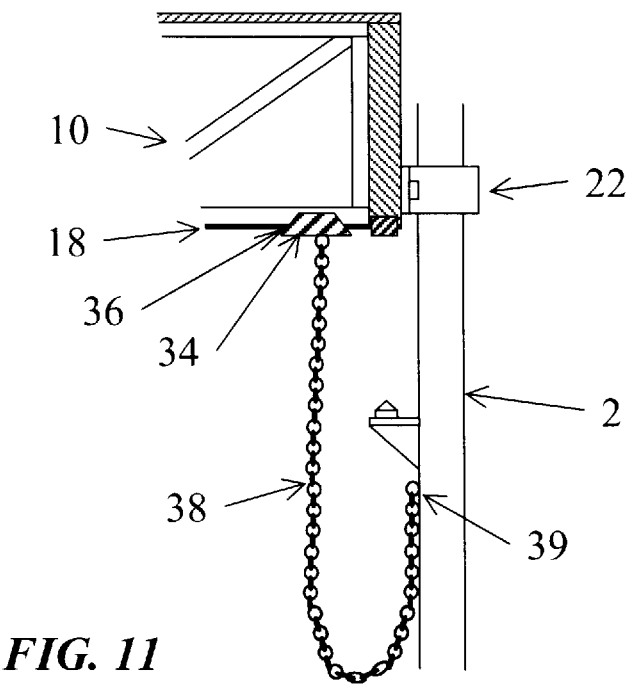
FIG. 11 is a sectional view of the floor shown in FIG. 7, during a flood event.

Referring to FIG. 11 the flood rest structure 1 also includes guide means in the form of collars 22 that are attached to the flooring structure 10, each of the collars 22 encompassing (or, in other embodiments, partially encompassing) a respective guide post 2. The collars 22 are a relatively loose fit, such that they can slide vertically along their respective guide posts 2, described in detail later.

Figure 12:
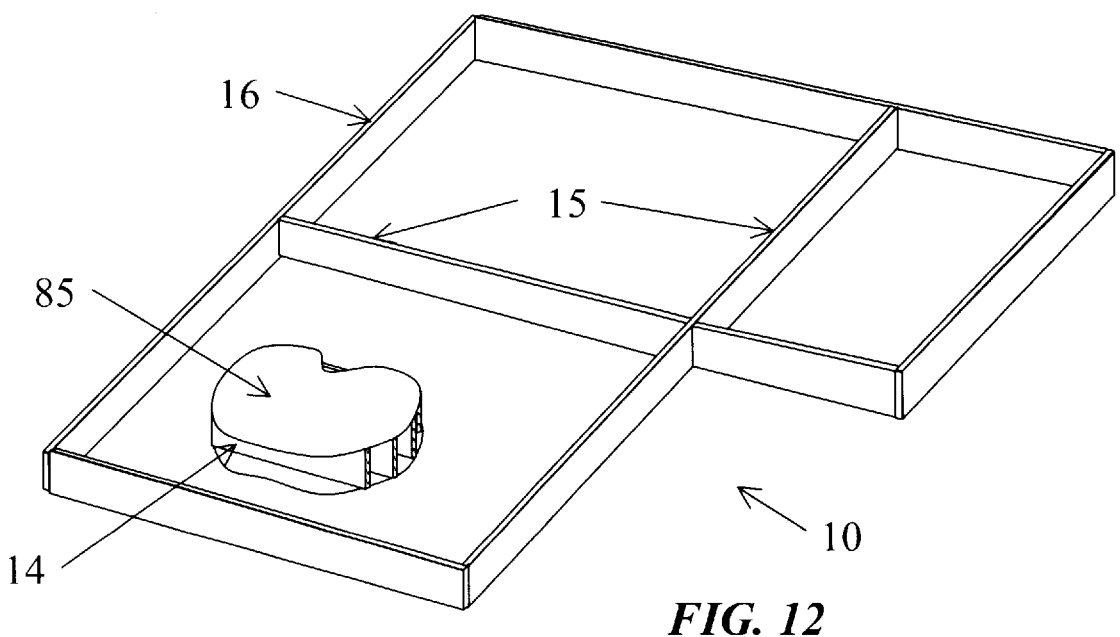
FIG. 12 is a perspective cut-away view of a floor structure for use with the invention.

FIG. 12 shows a perspective partially cut-away view of the flooring structure 10 without the superstructure 12. The cutaway reveals additional beams 15 that are incorporated into the flooring structure to support floor joists 14 where they do not span to beams 16 at the perimeter of the building structure 8. The additional beams 15 also provide structural continuity through the floor structure 10 by being rigidly connected to the rectangular perimeter beams 16. In combination, the beams 16, additional beams 15, flooring 85, sheeting material 18 and joists 14 act to transmit force and moment through the flooring structure 10. This results in a rigid, relatively monolithic floor structure 10 that acts to prevent relative movement within, and thus physical distress to, the superstructure 12. By virtue of this rigidity there is no need for additional leveling devices during a flood event, as is required with some prior art floatable buildings.

Figure 13:
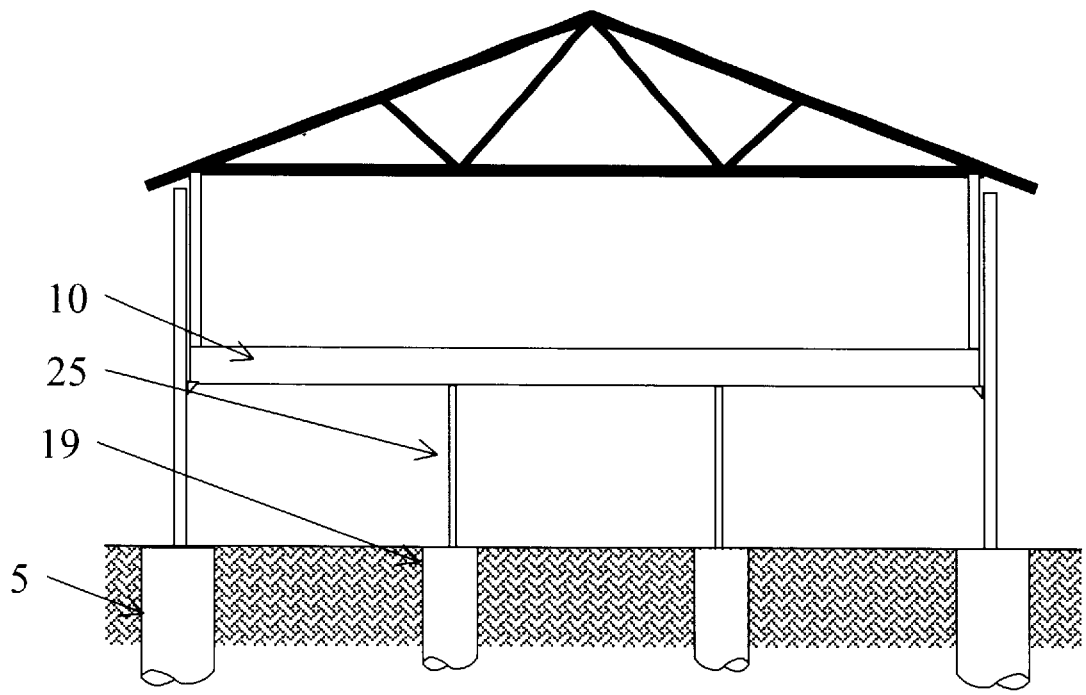
FIG. 13 is a sectional view of the preferred embodiment showing sub-floor posts.

FIG. 13 shows another form of the invention where the flooring structure 10 is supported on sub-floor posts 25. These sub-floor posts are located under the flooring structure 10, and are encased in caissons 19 at their lower ends. However, the sub-floor posts are not fastened vertically to the flooring structure 10, and therefore only provide support whilst the weight of the building structure 8, its contents, or part thereof, is upon them. During a flood event, once the buoyancy of the building structure 8 as a whole reaches a sufficient level, the flooring structure 10 disengages from the sub-floor posts 25. It will be appreciated that the sub-floor posts can form a supplementary support to the corbels 20, or can replace them entirely. Other, different types of support means will also suggest themselves to those skilled in the relevant art, although the preferred use of corbels has the benefit of simplicity.

Figure 14:
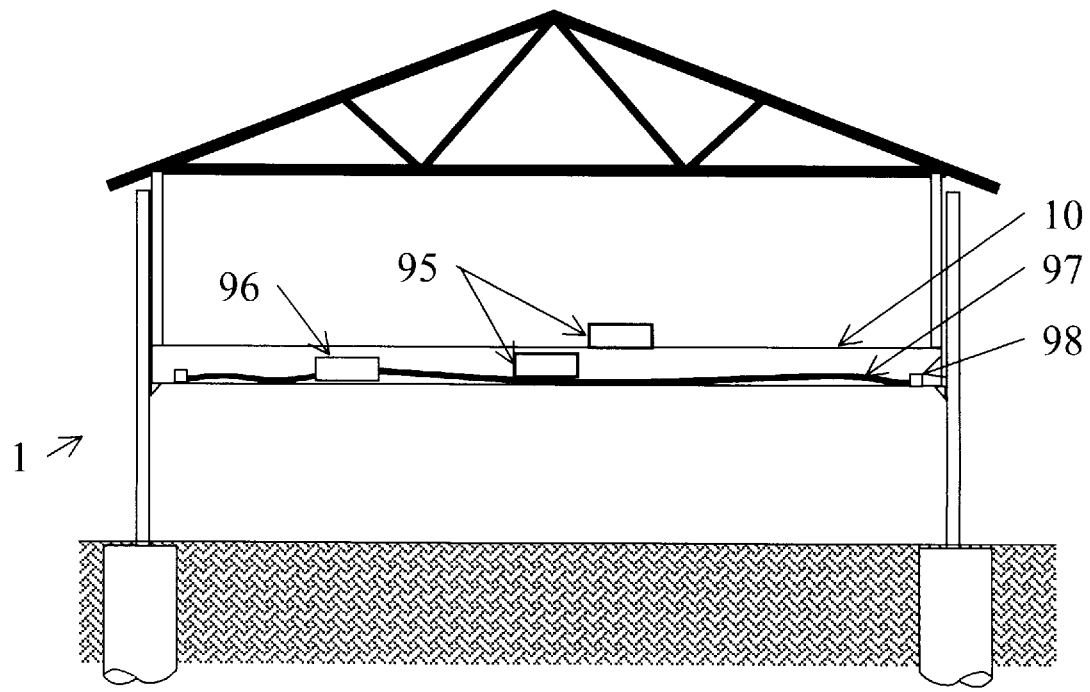
FIG. 14 is a sectional view of a building structure according to the invention showing back up services and a pump.

FIG. 14 shows a backup utility system 95 located in or on the flooring system 10. The backup 95 utility system comprises, for example, a pump, a fresh water tank, a sewage holding tank, and a generator. This backup utility system is connected to existing utility connections of the building once primary utility systems are detached from the building during a flood event. The ways in which this can be implemented will be apparent to those skilled in the art.

FIG. 14 further shows a flotation system comprising a dewatering pump 96 located in or on the watertight flooring system 10. The de-watering pump 96 is connected to a system of hoses 97 spread throughout the flotation system, the hoses terminating in water actuated valves 98. Thus any minor seepage or leakage into the compartments can be removed and disposed of. The maximum discharge capacity of the dewatering pump 96 is selected such that it does not interfere with the object of "scuttling" the building structure 8 as described later.

In a normal mode of use, the building structure 8 rests on the corbels 20 at a predetermined height above the ground. In the event of a flood, water is initially able to flow beneath the building structure 8, and therefore no damage occurs. As the flood waters rise, they initially come into contact with the waterproof sheeting material 18 and then the beams 16, which prevents the rising flood waters from entering the compartments 17 defined by the joists and beams. As the volume of water displaced by the compartments 17 increases, the buoyancy forces correspondingly increase.

As the water rises, the buoyancy forces eventually reach a point where the entire weight of the building structure 8 is borne by the buoyancy forces acting upon the flooring structure 10. As the flood waters rise beyond this point, the building structure 8 sinks no further below the surface of the water, but, rather, begins to float upwardly in relation to the ground and guide posts 2. The collars 22 prevent the building structure 8 from moving away with the flood waters in the event that the flood waters are themselves moving, and maintain the building in its correct orientation.

In the event of a "normal", relatively low level flood, the flood waters will peak whilst the building structure 8 has moved only partially along the guide posts 2, and then recede. When the flood waters recede, the building structure 8 floats downwardly along the guide posts 2. Once the corbels 20 are engaged, and the building structure 8 centred by means of the pin 42 and recess 48, the weight of the building structure 8 is gradually transferred to the corbels 20. Once the flood waters break contact with the flooring structure 10, the fill weight of the building structure 8 is supported by the corbels 20, placing it back into the normal mode of operation ready for subsequent flood events.

If, on the other hand, the flood waters rise even further, the building structure 8 will approach the upper limits of the guide posts 2. It is preferable that the height of the guide posts 2 be relatively selected such that the building structure 8 is able to float to the highest level of likely floods without reaching the tops of the guide posts. However, in the event of an extraordinary flood event, it is conceivable that the building structure will reach the upper limit of the guide posts. To prevent the building structure 8 from floating off the top of the guide posts 2 and the collars 22 disengaging therefrom, the upper end of each of the guide posts 2 incorporates a flange 24, as shown in FIG. 8, which prevents the respective collars 22 from sliding off the tops of the guide posts 2. It will be understood that any further increase in flood water level beyond the height at which the collars contact the flanges can result in flooding of the interior of the building structure. However, it is considered more desirable that this occur in the event of an extraordinary flood event than the building be allowed to float away with the flood to potentially destroy or cause serious damage to itself or nearby property.

Various other features are considered desirable when implementing the invention. A first of these is the use of rollers, bearings or pads of low friction polymeric material, such as polyethylene, (not shown) to reduce friction between the collars 22 and the guide posts 2. This can help prevent the attitude of the building changing due to one or more of the collars "sticking" at particular points along the guide post 2.

Figure 15:
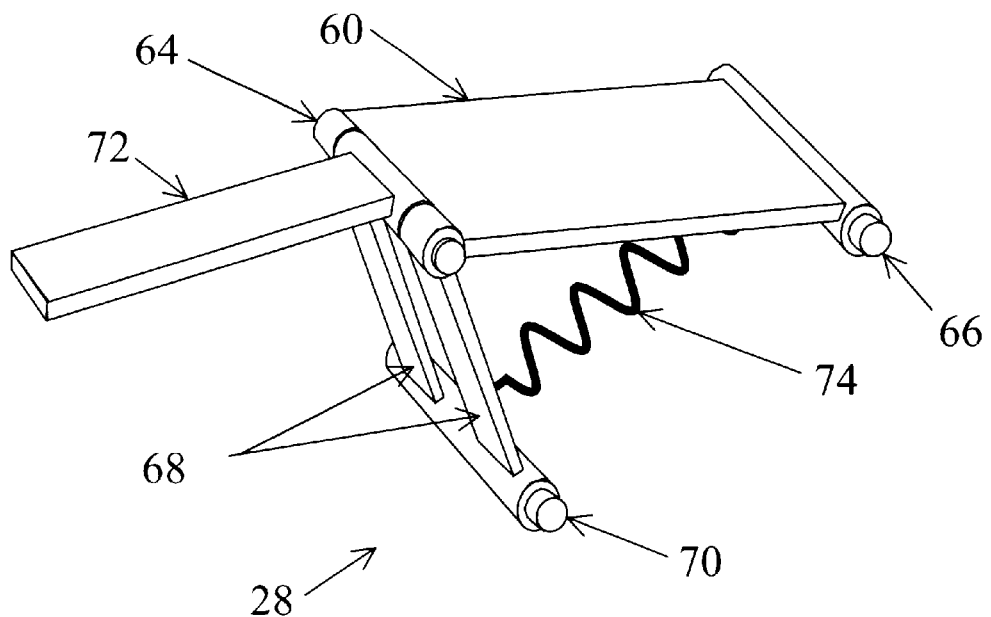
FIG. 15 is a perspective view of an upper corbel mechanism.

Another desirable option is the use of one or more retention means at one or more corresponding retention thresholds along each of the guide posts. Usually, the retention means will take the form of a pawl or spring loaded catch or corbel arrangement 28, such as that shown in FIG. 15. In this case, the spring-loaded catch includes a support member 60 connected to a lower pair of struts 68 by means of a hinge 64. An end of the support member 60 distal the hinge 64 terminates in an upper pin 66 that extends substantially parallel to the rotational axis of the hinge 64. Ends of the struts 68 similarly terminate in a lower pin 70 that also extends substantially parallel to the hinge axis. The catch 28 includes, in this case, a tongue 72 that is connected to the support member 60, via that portion of the hinge 64 which is rigidly connected to the support member 60, for rotation therewith about the hinge 64. In this embodiment, the tongue 72 is positioned approximately 150 degrees (clockwise) away from the support member 60. A tensioned spring 74 extends between the support member 60 and the lower pin 70.

Figure 16:
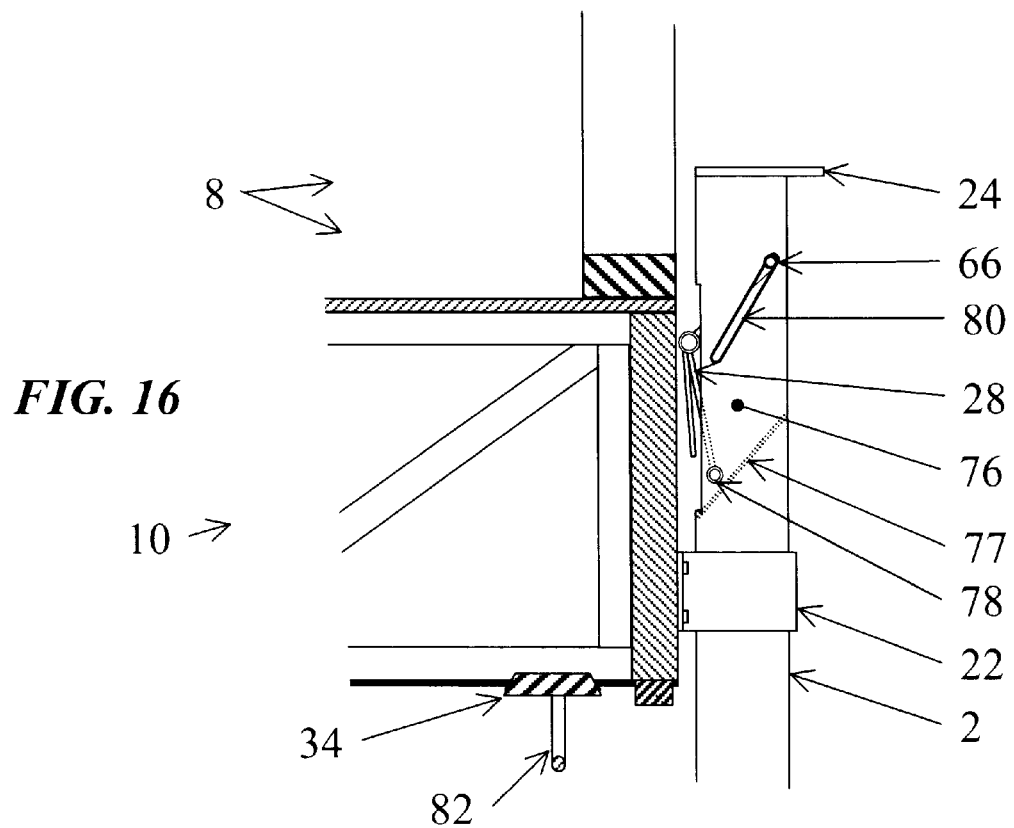
FIG. 16 is a sectional view of a floor structure of FIG. 7, near an upper limit of the guide posts.

Turning to FIG. 16 the catch 28 is mounted partially within a recess 76 formed in the guide post 2. The ends of the lower pin 70 are captured in respective opposed holes 78 formed in the recess, thereby allowing the struts 68 to hinge with respect to the guide post 2. The ends of the upper pin 66 engage respective slots 80 in the walls of the recess 76, such that the end of the support member 60 distal the hinge 64 can move slidably within the constraints of slot 80. A defecting plate 77 (shown dotted) diverts any water entering the recess 76 outwardly, thereby preventing undesirable moisture build-up within the recess.

In normal, non-flood conditions, the catches 28 are held slidably against the building structure 8, as shown in FIG. 16. During a flood event, as the building structure 8 moves upwardly along the respective guide posts 2, the spring loaded catches 28 are held within their corresponding recesses 76 by the proximity of the building structure 8, thereby allowing upward movement of the building structure 8 as the flood waters increase in level.

As the bottom of the flooring structure 10 passes the upper point of each catch 28, the spring 74 causes the support member 60 and struts 68 to rotate with respect to each other, which in turn causes the upper pin 66 to slide along the slots 80. Whilst this is happening, the struts 68 rotate about the holes 78 with respect to the guide post 2. This results in the arrangement shown in FIG. 17, whereby the support member 60 extends outwardly underneath the flooring structure 10. In this way, when the flood waters begin to recede, the catches 28 on each guide post 2 will prevent the building structure 8 from sliding any further down the guide post.

Once the flood waters begin to recede, the building structure 8 settles onto the catches 28, rather than settling onto the corbels 20 lower down the guide posts 2. Once the flood event is over, the building structure 8 can be raised from the catches 28 by cranes, jacks, or other lifting mechanism, the catches retracted and the building structure 8 lowered onto the lower corbels 20. It will be appreciated that the situations where such lifting mechanisms are required to be employed will be exceedingly rare since the flood waters must have risen to such an extent such that the building structure 8 has reached the upper limit of its travel along the guide posts 2.

In another embodiment (not shown), the catches 28 are omitted, whilst the flanges are included, Hence, the building structure is prevented from floating off the guide posts 2, but is not constrained from resting back onto the corbels 20.

In a particularly preferred form of the invention, there is provided flooding means for selectively reducing buoyancy of the building structure 8 as a whole by partially or wholly flooding one or more of the compartments 17. The flooding means, in the preferred form, includes one or more bung 34 and bung-hole 36 arrangements, as shown in FIG. 11. The bung-hole 36 is formed in the sheeting material 18, and the corresponding bung 36 is sized to sealingly fit within the corresponding bung-hole 36. The bung 34 has attached to it a chain 38, as shown, or rope that extends to a fixing point 39 that in this case is formed on a guide post 2.

In use, as the flood waters rise and the building structure 8 floats upwardly, the amount of slack in the chain 38 is gradually reduced. The length of chain is selected such that, at some point after the spring loaded catches 28 have been released, but before the flanges 24 can engage with the collars 22, the tension on the chain increases such that the bung 34 is popped from the bung-hole 36. This in turn allows the flood waters to enter any compartment that is in fluid communication with the bung-hole 36. As the compartments flood, the buoyancy of the building structure 8 as a whole is reduced.

In the preferred embodiment, enough water is able to enter the compartments that the buoyancy of the compartments is no longer sufficient to support the weight of the building structure as a whole. In this case, the building structure 8 is allowed to sink slightly until it engages the catches 28. The overall reduction in buoyancy caused by this scuttling of the building structure 8 ensures that the building structure 8 is not torn from the guide posts 2 by the large buoyancy forces that would otherwise have been generated once upward motion of the building structure 8 had been constrained by the flanges 24 atop the guide posts 2. It will be understood that further rises in flood waters risk flooding the interior of the superstructure 12. However, in such extraordinary flood events, it is considerably more desirable that the building not be swept away by flood waters which would otherwise run the risk of damaging itself or other property.

Once the flood waters begin to recede, water exits the bung-holes 36 until the compartments are effectively empty of water. This mechanism ensures that the weight of the water in the compartments does not provide an added burden to the catches 28.

Figure 17:
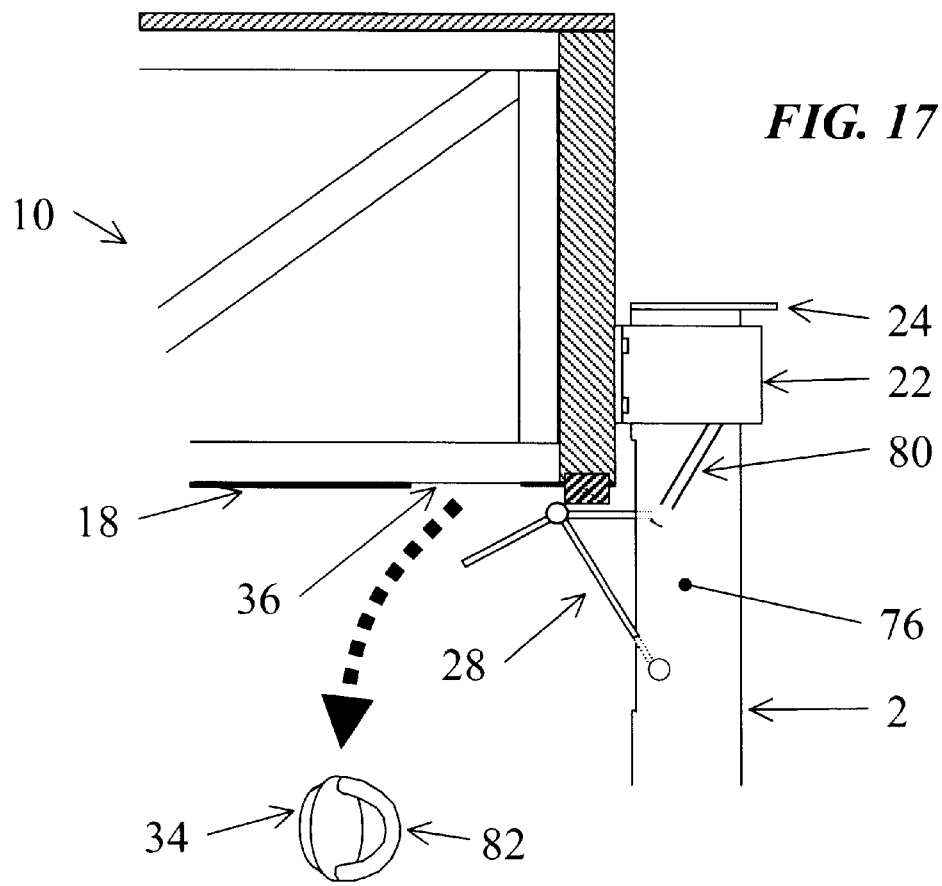
FIG. 17 is a sectional view of a floor structure of FIG. 7, with the floor structure reaching an upper limit of the guide posts.

In the embodiment shown in FIGS. 16 and 17, the bung 34 is equipped with a loop 82. As the flood water rises, and after the catch 28 is deployed as described above, the tongue 72 initially engages the loop 82. Further rises in water level cause the loop 82 to be caught and then extracted from the bung-hole 36 by the tongue 72. As described previously, this results in flooding of the compartments and corresponding reduction in buoyancy of the building 8.

It will be appreciated that any other suitable flooding or scuttling means can be employed, including more sophisticated valve and actuation mechanisms. For example, a poppet valve can be employed in place of a bung-hole and bung arrangement, and more sophisticated mechanisms employed to manage the buoyancy of the building structure 8 as a whole. However, the bung 34 and bung-hole 36 arrangement has the benefit of simplicity.

It will be appreciated that, in some cases, some residual water will be left behind in the compartments due to the positions of the bung-holes 36. In one embodiment, supplementary drainage holes (not shown) are provided. These drainage holes are sealed with a plug, screw lid, removable membrane or the like, which can be manually removed after a flood event to facilitate drainage of the components.

Occasionally, in non-flood conditions, a building structure can experience wind loads such that the net upward forces exceeds the weight of the structure and its contents. Without tie-down of the building through to the foundations it would thus be possible for a building to move upwards under the influence of the wind load. This is undesirable as it could cause damage to the building or contents and distress to the inhabitants. This wind event may occur at any time largely independent of any flood event.

Figure 18:
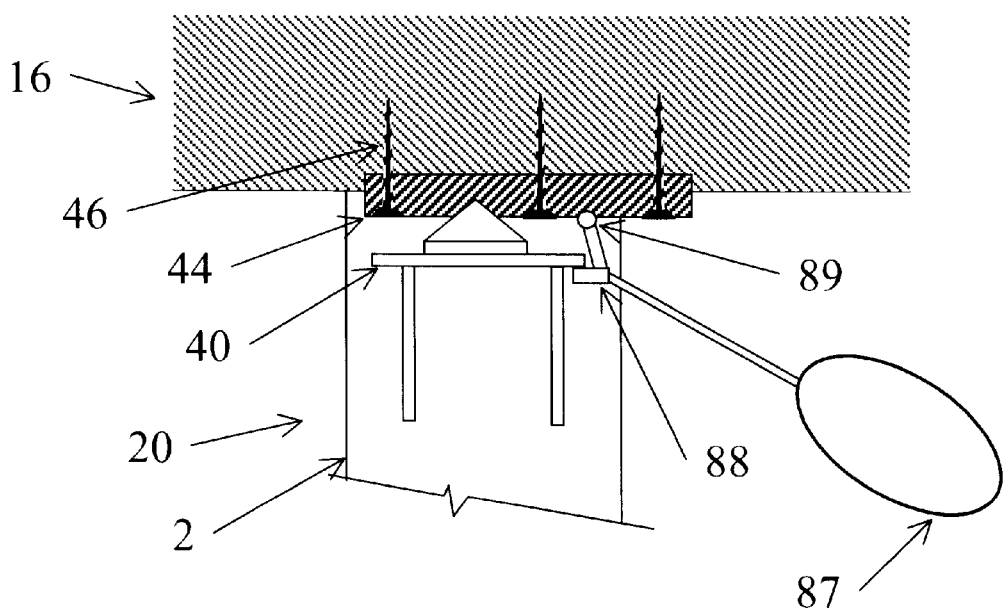
FIG. 18 is a sectional view of the corbel shown in FIG. 9, with the addition of a wind tie-down mechanism.

In an effort to mitigate these problems, in one embodiment a wind tie-down device is included. As best shown in the embodiment of FIG. 18, this tie-down device acts to hold the building downwardly under wind load but allows free vertical movement under the influence of floodwaters. The device includes angled catches 88 hingedly connected 89 to the load spreader 44, which in turn is fixed by the means of screws or bolts 46 to a beam 16. It will be appreciated that, in other embodiments, it is possible to directly connect the hinge 89 to the beam 16. The device further comprises a float 87 positioned at a lower level than the angled catch 88, and being rigidly connected via a rod to the catch 88. The float 87 is weighted such that it is positively buoyant yet heavy so that it does not move vertically under the influence of turbulent winds.

As the building structure 8 is forced upwards under the influence of wind load, the angled catch 88 engages with the underside of corbel top surface 40. This prevents any significant upward movement of the building structure 8. In a flood event, flood waters contacting the float cause it to move upwardly, which in turn causes the catch 88 to rotate about the hinge 89. The angled catch 88 then disengages the corbel top surface. This in turn allows the building structure 8 to move upwards under the influence of the rising flood waters, without being hindered by the angled catch 88.

As flood waters recede and the floatable flooring structure 10 comes to rest on the corbel 20, the float 87 drops thereby automatically engaging the angled catch 88 under the corbel top surface in preparation for a later wind event.

It will be appreciated that any other suitable water activated catch mechanisms can be employed, including other float and catch arrangements or electronically actuated catch mechanisms. However, the present arrangement has the benefit of simplicity.

The present invention provides a relatively flood resistant structure. In one preferred embodiment, the inclusion of flanges and a scuttling mechanism at the top of the guide posts ensures that an extreme flood event will not allow the building to be swept away. Other features and aspects of the various preferred embodiments also provide commercially significant improvement over prior art structures.

Although the invention has been described with reference to a number of specific examples, it will be appreciated by those skilled in the art that the invention can be embodied in many other forms.

What I claim as my invention is:

1. A flood resistant structure for use in flood-prone areas, said structure including:
    a) a building structure having a floor structure integral with said building structure,
    b) trussed floor joists integral with said floor structure whereby said trussed floor joists support said floor structure and the contents of said building structure,
    c) rectangular beams integral with said floor structure, some of which are at least are disposed contiguously around the perimeter of said floor structure, whereby said rectangular beams support said floor joists and said building structure,
    d) watertight sheathing means fixed to the underside of said floor structure,
    e) flotation means defined by watertight compartments so formed in said floor structure clad with said watertight sheathing material, whereby said flotation means are of sufficient buoyancy so as to enable said building structure to float on water when necessary,
    f) a plurality of guide posts disposed adjacent said building structure extending substantially vertically from support foundations and terminating above the normal height of said floor structure,
    g) guide means linking said building structure and said guide posts; and
    h) support means disposed on respective guide posts at a predetermined height above the foundation level such that said building structure is supported downwardly and laterally by said support means whilst allowing free upwards movement of said building structure,
    said flood resistant structure configured such that, in a usual configuration, said building structure is supported by said support means and thereby by said guide posts above said foundation level until, in the event of a flood, flood waters rise to a level sufficient to cause the weight of said building structure and contents to be transferred from said support means to said flotation means, wherein further increases in flood-water level cause said building structure and said building structure contents to float upwardly whilst said guide means maintain said building structure in a relatively stable lateral position with respect to said guide posts and said support foundations.

2. A flood resistant structure according to paragraph 1, wherein said guide posts are relatively uniformly spaced around said perimeter of said building structure.

3. A flood resistant structure according to paragraph 1, wherein said support means take the form of corbels disposed on respective guide posts.

4. A flood resistant structure according to paragraph 1, further including selective flooding means for allowing at least partial flooding of some or all of said flotation means once said building structure has floated beyond a predetermined height in relation to said guide posts whereby the buoyancy of said flotation means is reduced such that said building structure does not rise above and away from said guide posts.

5. A flood resistant structure according to paragraph 4, further including retention means, whereby said retention means is configured such that said building structure is prevented from lowering below said retention means after said selective flooding means is activated.

6. A flood resistant structure according to paragraph 5, wherein said retention means takes the form of a ratchet and pawl or spring-loaded corbel mechanism disposed between said support means and said building structure.

7. A flood resistant structure according to paragraph 4, wherein said selective flooding means includes a valve arrangement whereby said valve arrangement is able to cause said flooding.

8. A flood resistant structure according to paragraph 7, wherein said valve arrangement includes one or more plug and drain assemblies, wherein said plugs are respectively removed when said building structure reaches one or more predetermined heights with respect to said guide posts.

9. A flood resistant structure according to paragraph 1, further including flotation limiting means for providing a limit on upward flotation of said building structure with respect to said guide posts.

10. A flood resistant structure according to paragraph 1, wherein said guide means takes the form of one or more collars, which enclose the respective guide posts.

11. A flood resistant structure according to paragraph 10, wherein said guide means includes one or more rollers, bearings or low friction pads disposed between said collars and said guide posts allowing relatively low frictional vertical movement of said guide means and hence said building structure along said guide posts.

12. A flood resistant structure according to paragraph 1, further including support posts disposed under said building structure that downwardly support said building structure whereby said support posts are configured such that they freely allow upwards movement of said building structure.

13. A flood resistant structure according to paragraph 1, further including wind tie-down means for preventing the upwards movement of said building structure under the influence of wind loads, wherein said wind tie-down means automatically disengaged upon contact with flood waters.

14. Wind tie down means according to paragraph 13, wherein said wind tie-down means are disposed between said support means and said building structure.

15. A flood resistant structure according to paragraph 1, further including backup utility systems for the provision of services to said building during a flood.

16. A flood resistant structure according to paragraph 1, further including a dewatering system for the removal of minor water seepage from said flotation means.

* * * * *